April 7, 1931. W. DORNIG 1,799,156
ALTERNATING CURRENT GENERATOR WITH MODULATION FREQUENCY
Filed Feb. 13, 1930

Inventor
Walter Dornig
By Dowell & Dowell
his Attorneys.

Patented Apr. 7, 1931                                               1,799,156

UNITED STATES PATENT OFFICE

WALTER DOERNIG, OF BERLIN-DAHLEM, GERMANY

ALTERNATING-CURRENT GENERATOR WITH MODULATION FREQUENCY

Application filed February 13, 1930, Serial No. 428,198, and in Germany February 14, 1929.

My invention relates to improvements in alternating current generator with modulation frequency.

For telegraphic purposes frequency generators with an audible frequency of 500 periods, for example, are employed upon which a deeper note of 20 periods for example is superposed. This requirement has hitherto been satisfied in the following ways:

Either the current at 500 periods was split up by means of a rotating interrupter (commutator) into the rate of 20 periods, or the generator was constructed as a double current generator for both frequencies, or again for 500 and 520 periods, which were superposed.

Further, from the U. S. A. patent specification 1,597,453, an alternating current generator is known, the rotor of which is provided with teeth on a fractional part only thereof and rotates in front of several groups of separately excited magnets, whereby voltages are induced in its alternating current windings. For the generation of the exciting flux passing transversely through the rotor there serve two or more groups of magnets of different polarity located opposite to each other; the magnetization of the rotor is accordingly reversed. The modulation of the higher frequency by a lower one is not sinusoidal but split up as by means of an interrupter.

My present invention gives a much more refined solution, which is described in what follows in a preferred construction with reference to the accompanying drawing.

Figure 1:
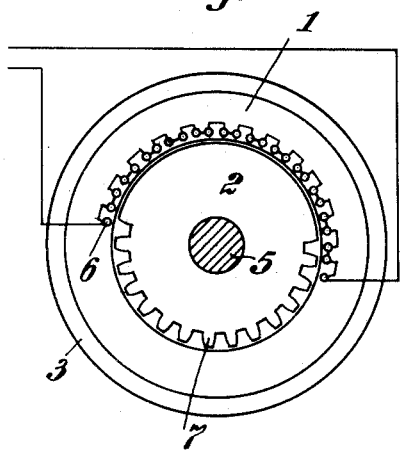
Fig. 1 shows diagrammatically a front view of a generator according to my invention.

In the drawing 1 is a stator of a normal homopolar generator type, in which as is known there occurs no reversal of magnetization of the rotor by the exciting flux, since stator and rotor always have the same polarity at the periphery. 2 is a rotor, 3 the casing of the generator, 4 the exciting winding, 5 the rotor shaft, 6 the alternating current winding in the stator slots, and 7 are the rotor teeth.

In contradistinction to this generally known construction it is new that stator and rotor are provided with slots and teeth respectively only on a part of the periphery in the example shown in the drawing over about half the periphery. If the generator according to the above-mentioned example has to supply 500 periods at 1200 revolutions per minute, then the stator ought to have 50 slots and the rotor 25 teeth on the whole periphery. In the stator, however, only a part of the slots, e. g. 26 slots in this case, is punched out, and the rotor has for example only 13 teeth on the half-periphery. One formed coil is located each in two stator-slots. For this reason it is expedient to choose an even number of slots, that is one slot more than would correspond with the exact half of the given number of slots, viz., 50.

Figure 3:
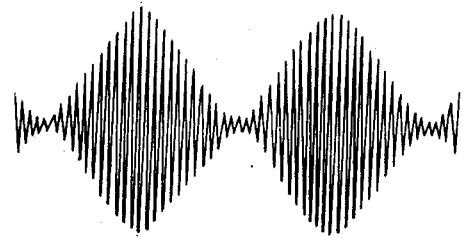
Fig. 3 is a reproduction of an oscillogram from an actually manufactured machine.

The thirteen coils in the 26 stator slots are connected here in series, and give rise to a modulated frequency according to the oscillogram of Fig. 3 recorded from a completed generator. In the position shown in Fig. 1 the generator voltage must be approximately nil; after about 180 degrees rotation a maximum. The high frequency amplitudes therefore vary up and down.

With the correct choice of the number of turns in the slots according to the rise of the sine curve, a sinusoidal modulation of the basic frequency can readily be obtained, as the oscillogram of Fig. 3 shows. In this case the first and last slots have only a few turns and the number of turns increase towards the middle according to the sine curve. In the example, therefore, the 26 wound slots (equal to 13 coils) ought to be graded in accordance with the following numbers of turns:—

1–4–7–10–12–14–15–14–12–10–7–4–1.

The grading will generally suffice as the oscillogram shows. The call-note is then clear and acts with precision. By choice of the number of turns, or if necessary by still finer grading from slot to slot, any desired modulation curve can naturally be produced, which is obvious to any body skilled in the art from the foregoing example without further explanation.

If the slots and teeth on the semi-periphery of stator and rotor are arranged contiguously, i. e. covering an arc of 180 degrees behind each other, as shown in the example of construction illustrated, then the modulation frequency amounts to one period per revolution. It is, however, also possible to distribute the slotted or toothed peripheral part of 180 degrees into two, three or more equal peripheral arcs, so that correspondingly higher modulation notes are produced.

Figure 2:
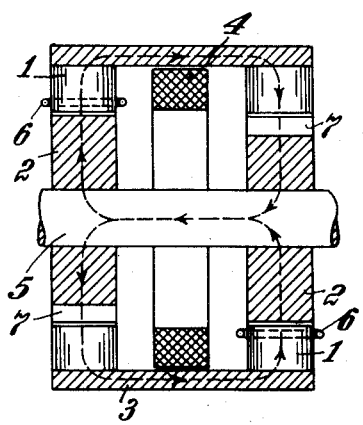
Fig. 2 shows a cross-section through the axis of a machine constructed as a double current generator.

If with the homopolar type as usually constructed two stators and two rotors are employed, each having one stator and rotor on the left and right of the exciting coil, as shown in Fig. 2, then each unit consisting of one stator and one rotor is shifted through 180 degrees with respect to the other unit, so as to automatically balance the rotating masses. In electrical relation correct phase connection is made, of course, in the event of two stator windings operating upon a common circuit.

A special advantage of my invention is to be found in the fact that no brushes nor interrupter are required, so that no attention is necessary in this respect.

Having now fully described my invention, what I claim and desire to secure by Letters Patent is:—

1. In an alternating current generator of the homopolar type with rotor and stator and invariable magnetic polarity at the periphery of stator and rotor, a series of slots upon one half of the periphery of said stator, alternating current windings in said slots comprising coils surrounding individual teeth and teeth likewise over one half of the periphery of said rotor, the said stator and rotor co-operating in such manner that the frequency produced is modulated.

2. In an alternating current generator of the homopolar type with rotor and stator and invariable magnetic polarity at the periphery of stator and rotor, a series of slots upon a contiguous peripheral part of said stator embracing about 180 degrees, alternating current windings in said slots comprising coils surrounding individual teeth and teeth likewise over a contiguous peripheral part of said rotor embracing about 180 degrees, the said stator and rotor co-operating in such manner that the frequency produced is modulated.

3. In an alternating current generator of the homopolar type with rotor and stator and invariable magnetic polarity at the periphery of stator and rotor, a series of slots upon one half of the periphery of said stator, alternating current windings in said slots comprising coils surrounding individual teeth, wherein the grading of the number of turns of the alternating current windings in said slots follows the sine curve, and teeth likewise upon one half of the periphery of said rotor, said stator and rotor co-operating in such manner that the frequency produced is modulated.

4. In an alternating current generator of the homopolar type with rotor and stator and invariable magnetic polarity at the periphery of stator and rotor, a series of slots upon a contiguous peripheral part of said stator embracing about 180 degrees, alternating current windings in said slots comprising coils surrounding individual teeth, wherein the grading of the number of turns of the alternating current windings in said slots follows the sine curve, and teeth likewise upon a contiguous peripheral part of said rotor embracing about 180 degrees, said stator and rotor co-operating in such a manner that the frequency produced is modulated.

In testimony whereof I affix my signature.

WALTER DORNIG.